(12) United States Patent
Nammi (10) Patent No.: US 8,855,227 B2
(45) Date of Patent: Oct. 7, 2014

(54) METHODS OF RECEIVING MULTIPLE INPUT MULTIPLE OUTPUT SIGNALS AND RELATED COMMUNICATION DEVICES

(75) Inventor: Sairamesh Nammi, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 525 days.

(21) Appl. No.: 13/213,575

(22) Filed: Aug. 19, 2011

(65) Prior Publication Data

US 2013/0044797 A1    Feb. 21, 2013

(51) Int. Cl.
| | |
|---|---|
| H04B 7/02 | (2006.01) |
| H04L 1/02 | (2006.01) |
| H04L 1/18 | (2006.01) |
| H04L 25/03 | (2006.01) |
| H04B 7/04 | (2006.01) |
| H04L 1/20 | (2006.01) |

(52) U.S. Cl.
CPC ........ *H04L 25/03891* (2013.01); *H04L 1/1835* (2013.01); *H04L 1/20* (2013.01); *H04B 7/0413* (2013.01)
USPC .......................................... 375/267; 375/347

(58) Field of Classification Search
USPC ................................................ 375/224, 267
See application file for complete search history.

(56) References Cited

U.S. PATENT DOCUMENTS

| | | | | |
|---|---|---|---|---|
| 7,295,624 B2 * | 11/2007 | Onggosanusi et al. | ....... | 375/267 |
| 8,310,981 B2 * | 11/2012 | Damnjanovic et al. | ....... | 370/319 |
| 8,503,375 B2 * | 8/2013 | Malladi et al. | ................ | 370/329 |

OTHER PUBLICATIONS

Ericsson: "4-branch MIMO for HSDPA", 3GPP TSG RAN WG1 Meeting #65, Barcelona, Spain; May 9-13, 2011; R1-111763; 17 pages.
Foschini, Gerald J., "Layered Space-Time Architecture for Wireless Communication in a Fading Environment When Using Multi-Element Antennas", *Bell Labs Technical Journal*, Autumn 1996, pp. 41-59.
Golden, G.D. et al., "Detection algorithm and initial laboratory results using V-BLAST space-time communication architecture", *Electronics Letters*, vol. 35 No. 1, Jan. 7, 1999; 2 pages.
Telatar, Emre, "Capacity of Multi-antenna Gaussian Channels", *European Transactions on Telecommunications*, vol. 10, Issue No. 6, pp. 585-595, Nov.-Dec. 1999.
Telatar, Emre, "Capacity of Multi-antenna Gaussian Channels"; 28 pages.

\* cited by examiner

*Primary Examiner* — Qutbuddin Ghulamali
(74) *Attorney, Agent, or Firm* — Myers Bigel Sibley & Sajovec, P.A.

(57) ABSTRACT

A MIMO (Multiple-Input-Multiple-Output) receiver may receive a plurality of MIMO transport blocks transmitted from a plurality of MIMO transmission antennas over a same carrier frequency. More particularly, a MIMO signal including the plurality of MIMO transport blocks may be received through a plurality of reception antennas, and respective measures of signal quality for each of the MIMO transport blocks may be computed. A MIMO transport block may be selected from the plurality of MIMO transport blocks based on the measures of signal quality, and the selected MIMO transport block may be decoded. Responsive to failure decoding the selected MIMO transport block, processing of all MIMO transport blocks received in the MIMO signal may be terminated. Related communication devices are also discussed.

19 Claims, 9 Drawing Sheets

| Configuration | Sector Throughput (Mbps) | | Cell edge Throughput (Kbps) | | % gain of SC with respect to MMSE | |
|---|---|---|---|---|---|---|
| | MMSE | SC | MMSE | SC | Sector Throughput | Cell edge Throughput |
| 2x2 | 14.55 | 18.05 | 329 | 338 | 24.05 | 2.75 |
| 4x4 | 20.46 | 26.52 | 242 | 375 | 29.62 | 54.96 |

Table 1. Gains for successive decoding and cancellation according to some embodiments relative to conventional MMSE detection.

METHODS OF RECEIVING MULTIPLE INPUT MULTIPLE OUTPUT SIGNALS AND RELATED COMMUNICATION DEVICES

TECHNICAL FIELD

The present disclosure is directed to wireless communications and, more particularly, to wireless communications using multiple transmit and receive antennas.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver are equipped with multiple antennas to provide a multiple-input multiple-output (MIMO) communication channel. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from an antenna array over a MIMO channel to a wireless terminal, for example, spatial multiplexing (or SM) may allow the simultaneous transmission of multiple symbol streams over the same frequency from different antennas of the base station antenna array. Stated in other words, multiple symbol streams may be transmitted from different antennas of the base station antenna array to the wireless terminal over the same downlink time/frequency resource element (TFRE) to provide an increased data rate. In a downlink from the same base station transmitting from the same antenna array to the same wireless terminal, transmit diversity (e.g., using space-time codes) may allow the simultaneous transmission of the same symbol stream over the same frequency from different antennas of the base station antenna array. Stated in other words, the same symbol stream may be transmitted from different antennas of the base station antenna array to the wireless terminal over the same time/frequency resource element (TFRE) to provide increased reliability of reception at the wireless terminal due to transmit diversity gain.

The performance of a wireless communication system can thus be improved using multiple antennas at the base station and/or wireless terminal to provide spatial multiplexing SM in more favorable channel conditions and to provide transmit diversity gain in less favorable channel conditions. Transmit diversity and/or spatial multiplexing may be implemented without knowledge of the wireless channel at the transmitter. In many wireless communication standards such as the 3$^{rd}$ Generation Partnership Project (3GPP), Long Term Evolution (LTE), High-Speed Downlink Packet Access (HSDPA), and/or Worldwide Interoperability for Microwave Access (WiMAX), however, knowledge of the wireless channel (referred to as channel state information or CSI) may be provided at the MIMO transmitter via feedback from the receiver as discussed, for example, in the 3$^{rd}$ Generation Partnership Project document entitled "UTRA-UTRAN Long Term Evolution (LTE) And 3GPP System Architecture Evolution (SAE)" (http://www.3gpp.org/Highlights/LTE/LTE.htm). Accordingly, the MIMO transmitter can use the channel state information (or CSI) to provide precoding to further improve system performance as discussed, for example, by Scaglione et al. in "Optimal Designs For Space-Time Linear Precoders And Decoders" (IEEE Transactions On Signal Processing, Vol. 50, No. 5, May 2002, pages 1051 to 1064) and by Sampath et al. in "Generalized Linear Precoder And Decoder Design For MIMO Channels Using The Weighted MMSE Criterion" (IEEE Transactions On Communications, Vol. 49, No. 12, December 2001, pages 2198 to 2206). CSI precoding can thus be used by a MIMO transmitter to provide beam forming gain and/or to condition transmissions to existing characteristics of the wireless channel.

Multiple transmit and receive antennas can thus increase a data carrying capacity of a wireless system. For such multiple-input multiple-output (MIMO) systems, Maximum-Likelihood and/or Maximum A posteriori Probability (ML/MAP) detection using exhaustive search may be difficult to implement because MIMO detector complexity increases exponentially with the number of transmit antennas or/and with the number of bits per constellation point.

Detector structures have been proposed to reduce complexity of MIMO detectors. These proposed detectors can be classified as linear and nonlinear detectors. Linear detectors may include zero-forcing (ZF) and minimum mean-square error (MMSE) detectors, and nonlinear detectors may include decision feedback, nulling-cancelling, and/or variations thereof that rely on successive interference cancellation. These detectors may be relatively easy to implement but their bit error rate (BER) and/or Frame error rate (FER) performance may be less than that of a MIMO detector using exhaustive searching.

A MIMO communication system with N_t transmit antennas may support the simultaneous transmission/reception of N_t transport blocks over a same carrier frequency. Prior to transmission, CRC (cyclical redundancy check) bits may be added to each transport block and passed to a channel encoder which adds parity bits to protect the data. The bit stream of each transport block (including CRC and channel encoder parity bits) is then passed through an interleaver where an interleaver size may be adaptively controlled by puncturing to increase the data rate. More particularly, the interleaver size may be adaptively controlled using information from the feedback channel, for example, using channel state information provided by the remote receiver. The interleaved data for each transport block is then passed through a respective modulator (to provide symbol mapping), and the modulator may also be controlled using information from the feedback channel. The resulting symbol stream for each transport block, for example, may then be subjected to an Inverse Fast Fourier Transform (IFFT) before transmission from a respective MIMO antenna. IFFT may be used for transmissions in communication systems which implement OFDMA (orthogonal frequency division multiple access) as the access technology (e.g., LTE, LTE-A, Wi-max, etc.). For other systems which implement CDMA (code division multiple access) as the access technology (e.g., HSDPA, etc), IFFT may be replaced by spreading/scrambling.

For each receiver antenna in an OFDMA access technology system, a Fast Fourier Transform (FFT) operation may be performed for each receiver antenna in a radio frequency front end to generate a stream of discrete digital baseband samples for each receiver antenna. In systems using other access technologies, baseband samples may be generated using other operations. For example, a despreading/descrambling operation may be used to generate baseband samples in a CDMA access technology.

A linear MMSE detector may then be used to generate respective symbol streams for each of the transport blocks with reduced multi antenna interference. A demodulator (also referred to as a de-mapper) may then compute bit log likelihood ratios from the MMSE symbol outputs to provide respective bit streams for each of the transport blocks. The bit stream for each transport block is then de-interleaved and subject to channel decoding, and a CRC check is done on the output of the channel decoder for each transport block. For each transport block, if the transport block passes the cyclic redundancy check (CRC), an ACK (acknowledge message) for the passing transport block is sent to the transmitting device (i.e., the device that transmitted the passing transport block) via a feedback channel. If the cyclic redundancy check for a transport block fails, then a NAK (negative acknowledge message) for the failing transport block is sent to the transmitter (i.e., the device that transmitted the failing transport block). Each transport block may thus be transmitted/retransmitted from the transmitting device until an ACK is received from the receiving device.

In a conventional cancellation algorithm, if one transport block passes CRC and another transport block fails CRC, the passing transport block may be reconstructed, and the reconstructed passing transport block may be used to reduce interference caused by the passing transport block at an input of the MMSE detector relative to the failing transport block. This conventional cancellation may work well for 2×2 MIMO systems (i.e., systems with 2 transmit antennas and 2 receive antennas supporting 2 transport blocks), but may be inefficient for higher order MIMO antenna systems (e.g., 4×4 systems with 4 transmit and 4 receive antennas supporting 4 transport blocks, in 8×8 systems with 8 transmit antennas and 8 receive antennas supporting 8 transport blocks, etc.). Moreover, the use of a decoder (e.g., a turbo decoder) may be relatively complex (e.g., requiring numerous multiplication operations).

In MIMO systems supporting the simultaneous transmission of two or more transport blocks, however, conventional a cancellation algorithm may be relatively inefficient when more than one transport block fails the cyclic redundancy check.

SUMMARY

It is therefore an object to address at least some of the above mentioned disadvantages and/or to improve performance in a wireless communication system.

According to some embodiments, a method of receiving a plurality of multiple-input-multiple-output (MIMO) transport blocks transmitted from a plurality of MIMO transmission antennas over a same carrier frequency may include receiving a MIMO signal including the plurality of MIMO transport blocks through a plurality of reception antennas. Respective measures of signal quality may be computed for each of the MIMO transport blocks, and a MIMO transport block may be selected from the plurality of MIMO transport blocks based on the measures of signal quality. The selected MIMO transport block may then be decoded. Responsive to failure decoding the selected MIMO transport block, processing of all MIMO transport blocks received in the MIMO signal may be terminated. Signal strengths, spectral efficiencies, and/or information metrics, for example, may be computed as the respective measures of signal quality. Moreover, the selected MIMO transport block may be selected as the MIMO transport block having the highest signal quality (e.g., having the highest signal strength, spectral efficiency, and/or information metric).

The MIMO transport block having the highest signal quality (e.g., having the highest signal strength, spectral efficiency, and/or information metric) is the most likely transport block to be successfully decoded. If this MIMO transport block cannot be successfully decoded, then it is unlikely that any of the other MIMO transport blocks (having lower signal quality) will be successfully decoded, and processing overhead and/or power consumption may be reduced by terminating decoding of the other transport blocks with lesser signal quality. If the MIMO transport block having the highest signal quality is successfully decoded, the decoded transport block may be reconstructed and used to reduce multi-antenna interference with respect to the remaining transport blocks thereby increasing the likelihood of successfully decoding remaining transport blocks having lower signal quality.

According to some other embodiments, a communication device may be configured to receive a plurality of multiple-input-multiple-output (MIMO) transport blocks transmitted from a plurality of MIMO transmission antennas over a same carrier frequency. The communication device may include a radio frequency front end and a baseband processor coupled to the radio frequency front end. The radio frequency front end is configured to receive a MIMO signal including the plurality of MIMO transport blocks through a plurality of reception antennas. The baseband processor is configured to compute respective measures of signal quality for each of the MIMO transport blocks, to select a MIMO transport block from the plurality of MIMO transport blocks based on the measures of signal quality, to decode the selected MIMO transport block, and to terminate processing of all MIMO transport blocks received in the MIMO signal responsive to failure decoding the selected MIMO transport block.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with wireless terminals (also referred to as UEs). It will be understood, however, that the present invention is not limited to such embodiments and may be embodied generally in any type of communication network. As used herein, a wireless terminals or UE can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of the present invention disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

Figure 1:
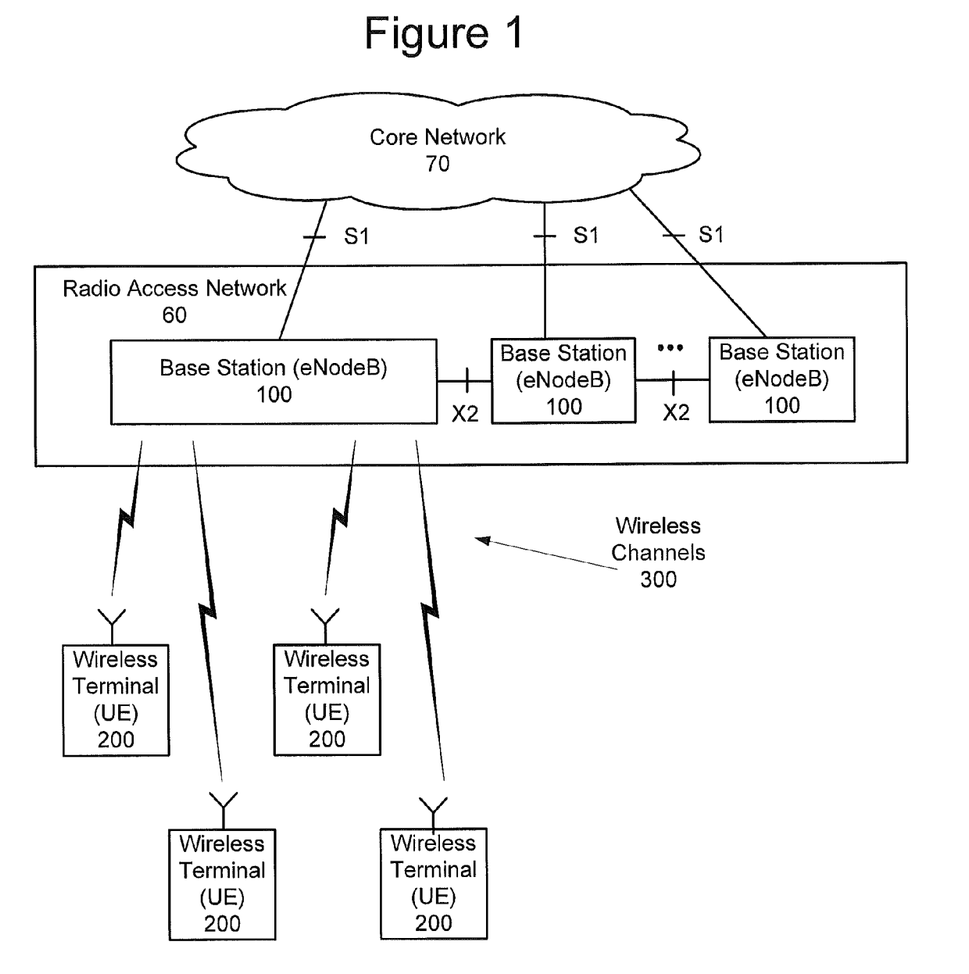
FIG. 1 is a block diagram of a communication system that is configured according to some embodiments.

FIG. 1 is a block diagram of a communication system that is configured to operate according to some embodiments of the present invention. An example RAN 60 is shown that may be a Long Term Evolution (LTE) RAN. The LTE RAN is a variant of a 3GPP RAN where radio base stations (e.g., eNodeBs) 100 are connected directly to one or more core networks 70 rather than to radio network controller (RNC) nodes. In LTE, the functions of a radio network controller (RNC) node are performed by the radio base stations 100. The radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

Figure 2:
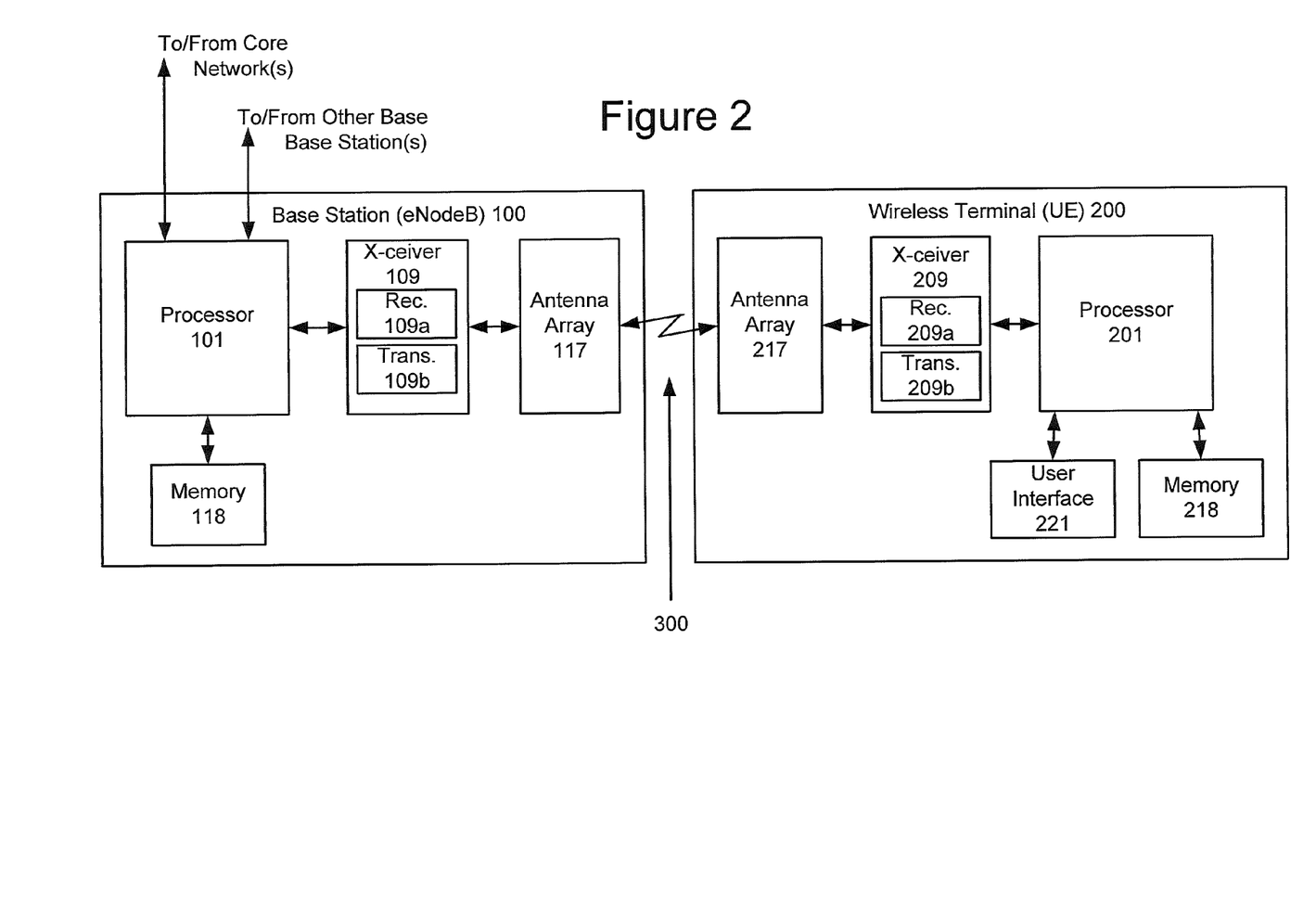
FIG. 2 is a block diagram of a base station and a wireless terminal (UE) in communication over a wireless channel according to some embodiments of FIG. 1.

FIG. 2 is a block diagram of a base station 100 and a wireless terminal 200 of FIG. 1 in communication over a wireless channel 300 according to some embodiments of the present invention. As shown, base station 100 may include transceiver 109 coupled between processor 101 and antenna array 117 (including multiple antennas), and memory 118 coupled to processor 101. More particularly, transceiver 109 may include receiver 109a and transmitter 109b. Receiver 109a may be configured to generate a digital data stream corresponding to one or more transport blocks received through antenna array 117 from wireless terminal 200. Transmitter 109b may be configured to transmit one or more transport blocks through antenna array 117 to wireless terminal 200 responsive to a digital data stream from processor 101.

Wireless terminal 200 may include transceiver 209 coupled between antenna(s) 217 and processor 201, and user interface 221 and memory 218 may be coupled to processor 201. More particularly, transceiver 209 may include receiver 209a and transmitter 209b. Receiver 209a may be configured to generate a digital data stream corresponding to one or more transport blocks received through antenna array 217 from base station 100. Transmitter 209b may be configured to transmit one or more transport blocks through antenna array 217 to base station 100 responsive to a digital data stream from processor 201. Accordingly, base station 100 may transmit communications through transmitter 109b (of transceiver 109) and antenna array 117 for reception at wireless terminal 200 through antenna(s) 217 and receiver 209a (of transceiver 209), and wireless terminal 200 may transmit communications though transmitter 209b (of transceiver 209) and antenna(s) 217 for reception at base station 100 through antenna array 117 and receiver 109a (of transceiver 109).

Figure 3:
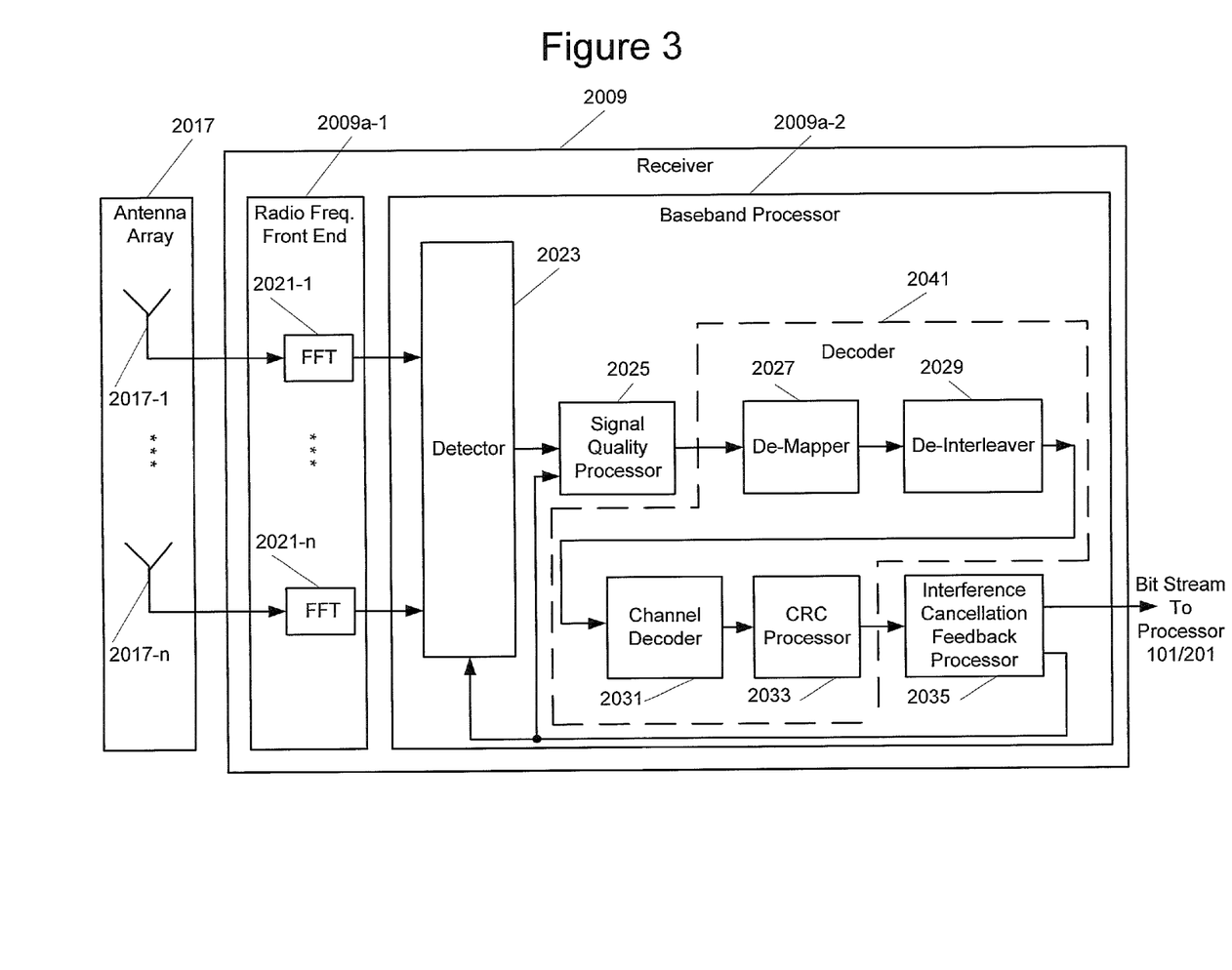
FIG. 3 is a block diagram of a receiver according to some embodiments of FIG. 2.

FIG. 3 is a block diagram illustrating receiver 2009 coupled to antenna array 2017 according to some embodiments. Receiver 2009 may be implemented, for example, as receiver 109a of base station transceiver 109, or as receiver 209a of wireless terminal transceiver 209. If receiver 2009 is implemented as receiver 109a of base station transceiver 109, antenna array 2017 is implemented as antenna array 117 of base station 100. If receiver 2009 is implemented as receiver 209a of wireless terminal transceiver 209, antenna array 2017 is implemented as antenna array 217 of wireless terminal 200.

As shown, receiver 2009 may include radio frequency (RF) front end 2009a-1 and baseband processor 2009a-2. Radio frequency front end, for example, is configured to generate discrete digital baseband samples corresponding to respective ones of antennas 2017-1 to 2017-n, where n is the number of antennas included in antenna array 2017. Accordingly, n may also be the largest number of transport blocks that may be simultaneously received at receiver 2009 over the same carrier frequency. As shown in FIG. 3, RF front end 2009a-1 may provide respective Fast Fourier Transformations (FFTs) 2021-1 to 2021-n for signals from respective antennas 2017-1 to 2017-n . RF front end 2009a-1, for example, may be implemented using FFTs 2021-1 to 2021-n in systems using OFDMA (orthogonal frequency division multiple access) access technologies. RF front end 2009a-1, however, may be implemented using other processing when implemented in systems using other access technologies. For example, RF front end 2009a-1 may be implemented using despreaders/descramblers (instead of FFTs) when receiver 2009 is implemented in a system using a CDMA access technology.

Baseband processor 2009a-2 is configured to generate a bit stream responsive to the digital baseband samples from RF front end, and to provide the bit stream to processor 101/201. If receiver 2009 is implemented as receiver 109a of base station transceiver 109, the bit stream generated by baseband processor 2009a-2 is provided to base station processor 101 for communications from wireless terminal 200 to other wireless terminals, to core network(s), and/or to other base stations. If receiver 2009 is implemented as receiver 209a of wireless terminal transceiver 209, the bit stream generated by baseband processor 2009a-2 is provided to wireless terminal processor 201 for output through user interface 221 (e.g., as audio, video, text) and/or storage in memory 218.

As further shown in FIG. 3, baseband processor 2009a-2 may include a detector 2023 configured to detect symbol streams for each of the plurality of transport blocks that are simultaneously received through antennas 2017-1 to 2017-n of antenna array 2017 responsive to digital baseband samples from RF front end 2009a-1. Detector 2023, for example, may be configured to detect the symbol streams using a linear detection technique such as minimum mean square error (MMSE) detection. Baseband processor 2009a-2 may also include signal quality processor 2025, de-mapper 2027, de-interleaver 2029, channel decoder 2031, cyclic redundancy check (CRC) processor 2033, and interference cancellation feedback processor 2035, operations of which are discussed in greater detail below. De-mapper 2027, de-interleaver 2029, channel decoder 2031, cyclic redundancy check processor 2033, and interference cancellation feedback processor 2035 may be provided as elements of decoder 2041 (shown with dashed lines to avoid confusion with respect to interconnections between/with elements thereof).

As noted above, radio front end 2009a-1 may be configured to receive a MIMO signal including the plurality of MIMO transport blocks through a plurality of reception antennas 2017 and to generate digital baseband samples for each of the MIMO antennas 2017-1 to 2017-n responsive to the MIMO signal. More particularly, the plurality of MIMO transport blocks of the MIMO signal may be transmitted/received simultaneously over a same carrier frequency. Baseband processor 2009a-2 includes detector 2023 that is configured to detect symbol streams for each of the MIMO transport blocks responsive to the digital baseband samples from RF front end 2009a-1.

According to some embodiments, signal quality processor 2025 is configured to compute respective measures of signal quality (e.g., signal strength, spectral efficiency, mutual information metric, etc.) for each of the MIMO transport blocks based on the detected symbol streams for the respective MIMO transport blocks. For example, signal quality processor 2025 may be configured to compute the measures of signal quality by computing respective signal strengths for each of the MIMO transport blocks, and more particularly, by computing respective signal-to-interference-and-noise-ratios (SINRs) for each of the MIMO transport blocks. In an alternative, signal quality processor 2025 may be configured to compute the measures of signal quality by computing EESMs (Exponential Effective Spectral efficiency Metrics) for each of the MIMO transport blocks, and using the EESMs to compute differences between effective SNRs (Signal to Noise Ratios) and a SNR threshold. In another alternative, signal quality processor 2025 may be configured to compute the measures of signal quality by computing MIMs (Mutual Information Metrics) for each of the MIMO transport blocks, and using the MIMs for the given modulation minus the coding rate for each of the MIMO transport blocks. Signal quality processor 225 may be further configured to sort the MIMO transport blocks by signal quality (e.g., according to signals strength and/or SINR) and to select the MIMO transport block having the highest measure of signal quality (e.g., having the highest signal strength, spectral efficiency, information metric, etc.).

Decoder 2041 of baseband processor 2009a-2 may be configured to decode the MIMO transport block of the plurality of MIMO transport blocks having the highest measure of signal quality, for example, using de-mapper 2027, de-interleaver 2029, channel decoder 2031, and CRC processor 2033. More particularly, de-mapper 2027 (also referred to as a demodulator) may be configured to de-map symbols for the selected MIMO transport block to provide an interleaved bit stream for the MIMO transport block having the highest measure of signal quality. De-interleaver 2029 may be configured to de-interleave the interleaved bit stream to provide a de-interleaved bit stream for the MIMO transport block having the highest measure of signal quality. Channel decoder 2031 may be configured to decode a channel using the de-interleaved bit stream to provide a channel decoded bit stream for the MIMO transport block having the highest measure of signal quality. CRC processor 2033 may be configured to perform a cyclical redundancy check (CRC) on the channel decoded bit stream.

Interference cancellation feedback processor 2035 may be configured to determine if the channel decoded bit stream for the MIMO transport block having the highest measure of signal quality (e.g., highest signal strength, spectral efficiency, information metric, etc.) was successfully decoded. Responsive to failure decoding the MIMO transport block having the highest measure of signal quality, interference cancellation feedback processor 2035 may be configured to terminate processing of all MIMO transport blocks received in the MIMO signal and to initiate transmission of a negative acknowledge (NACK) message for all of the transport blocks received in the MIMO signal. If the MIMO transport block having the highest measure of signal quality (e.g., highest signal strength, spectral efficiency, information metric, etc.) cannot be decoded successfully, there is a low probability that the remaining MIMO transport blocks having lower signal quality (e.g., lower signal strength, spectral efficiency, information metric, etc.) can be decoded. Accordingly, processing overhead and/or power consumption may be reduced by terminating processing of MIMO transport blocks and requesting retransmission via the NACK message. Interference cancellation feedback processor 2035 may inform processor 101/201 of the failure decoding the MIMO transport block having the highest measure of signal quality, and processor 101/201 may initiate transmission of the NACK message for all of the transport blocks over the wireless channel to the device (e.g., wireless terminal 200 or base station 100) that transmitted the MIMO signal. Responsive to the NACK message for all of the transport blocks, the original transmitting device may retransmit all of the transport blocks, for example, at higher power, at lower data rate, using updated channel state information, etc.

Responsive to successfully decoding the MIMO transport block having the highest measure of signal quality (e.g., highest signal strength, spectral efficiency, information metric, etc.), interference cancellation feedback processor 2035 may be configured to initiate transmission of an acknowledge message for the successfully decoded MIMO transport block having the highest measure of signal quality. Interference cancellation feedback processor 2035 may be further configured to provide a reconstruction of the MIMO transport block having the highest measure of signal quality that is used by detector 2023 to reduce a component of the MIMO signal corresponding to the MIMO transport block having the highest measure of signal quality to thereby generate a reduced MIMO signal including remaining ones of the plurality of MIMO transport blocks excepting the decoded MIMO transport block. Decoder 2041 of baseband processor 2009a-2 may then be configured to decode one or more of the remaining ones of the plurality of MIMO transport blocks using the reduced MIMO signal.

According to some embodiments, decoder 2041 of baseband processor 2009a-2 may be configured to decode and/or attempt to decode each of the remaining transport blocks in the original order of measured signal quality. For example, decoder 2041 may be configured to decode or attempt to decode each of the remaining transport blocks using the reduced MIMO signal (generated by reducing the component of the MIMO signal corresponding to the decoded MIMO transport block having the highest measure of signal quality). In an alternative, decoder 2041 may attempt to sequentially decode each of the remaining transport blocks in order of the originally computed measures of signal quality with each successfully decoded transport block being reconstructed and used to further reduce interference with respect to subsequently decoded transport blocks. In another alternative, further decoding of transmit blocks having lower measures of signal quality may be terminated upon failing to successfully decode any transport block of higher measured signal quality. For each successfully decoded transport block, baseband processor 2009a-2 may initiate transmission of a respective ACK message to acknowledge successful receipt thereof. For each unsuccessfully decoded transport block and for each undecoded transport block for which decoding is terminated, baseband processor 2009a-2 may initiate transmission of a respective NACK message.

According to some other embodiments, if the MIMO transport block having the highest measure of signal quality is successfully decoded, detector 2023 may be configured to reduce a component of the MIMO signal corresponding to the MIMO transport block having the highest measure of signal quality to generate a reduced MIMO signal including remaining ones of the plurality of MIMO transport blocks and to detect respective symbol streams for the remaining MIMO transport blocks. Signal quality processor 2025 may be configured to recompute respective measures of signal quality for each of the remaining ones of the plurality of MIMO transport blocks excepting the decoded MIMO transport block using detected symbol streams generated using the reduced MIMO signal. Decoder 2041 (e.g., including de-mapper 2027, de-interleaver 2029, channel decoder 2031, and CRC processor 2033) may then be configured to decode the remaining one of the MIMO transport blocks having a highest measure of signal quality. Interference cancellation feedback processor 2035 may then terminate processing of all of the remaining transport blocks responsive to failure decoding the remaining MIMO transport block having the highest measure of signal quality, and initiate transmission of a negative acknowledge (NACK) message for all of the remaining transport blocks responsive to the failure decoding the remaining MIMO transport block having the highest measure of signal quality. If the remaining MIMO transport block having the highest measure of signal quality is successfully decoded, each of the successfully decoded MIMO transport blocks may be reconstructed and used to generate a reduced MIMO signal, the reduced MIMO signal can be used by detector 2023 to detect symbol streams for each of the remaining transport blocks, signal quality processor 2025 can order/reorder based on the measures of signal quality computed using the detected symbol streams, and decoding can be preformed for a next remaining transport block having a highest measure of signal quality. Stated in other words, re-ordering according to signal quality may occur at each iteration until either all transport blocks have been decoded or until baseband processor is unable to decode one of the transport blocks.

Figure 4:
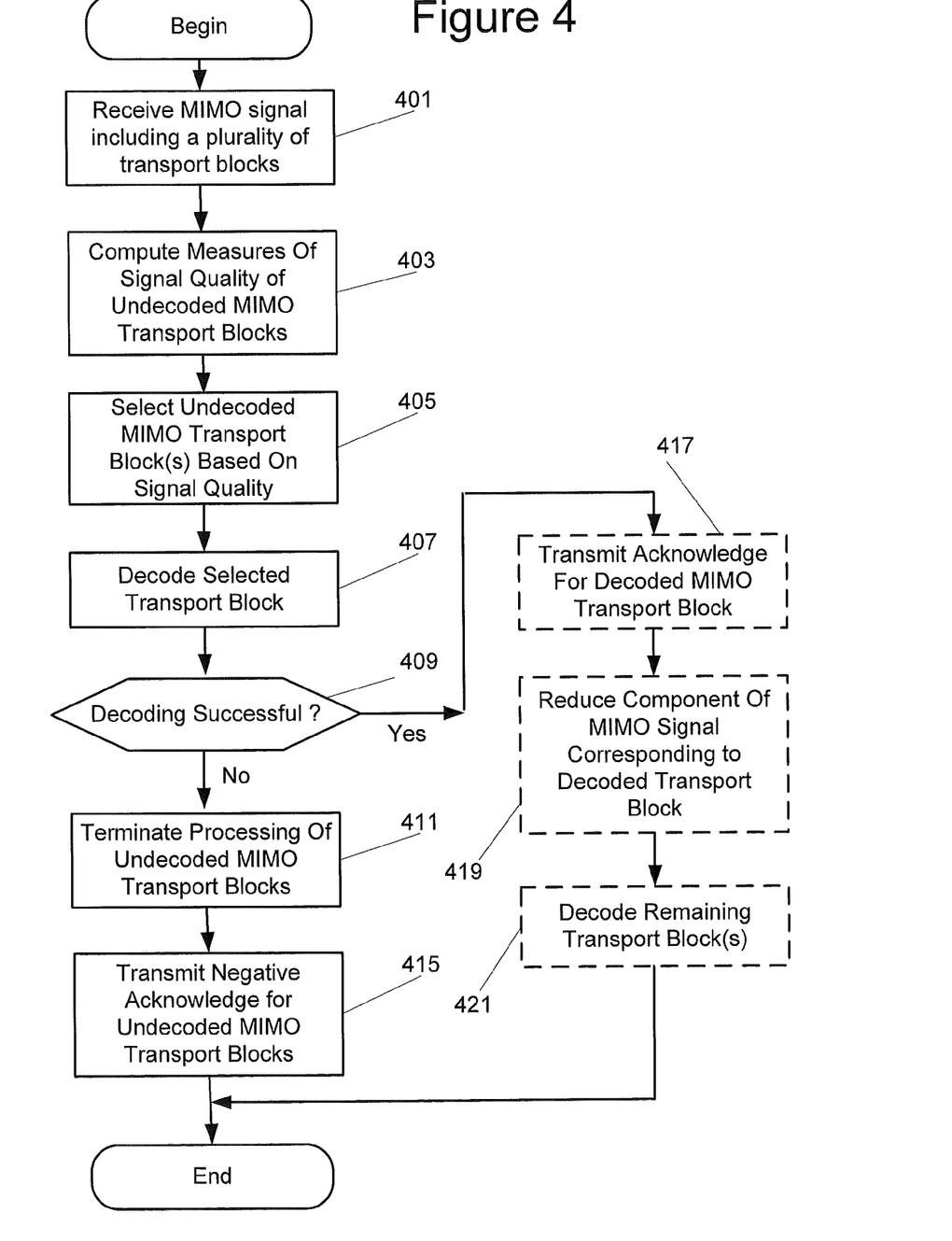
FIGS. 4, 5, 6, and 7 are flow charts illustrating receiver operations according to some embodiments.

Operations of receiver 2009 will now be discussed in greater detail below with respect to FIGS. 4, 5, 6, and 7. FIG. 4 is a flow chart illustrating operations of receiver 2009 that is configured to receive a plurality of multiple-input-multiple-output (MIMO) transport blocks transmitted from a plurality of MIMO transmission antennas over a same carrier frequency according to some embodiments. At block 401, radio frequency (RF) front end 2009a-1 receives a MIMO signal including the plurality of MIMO transport blocks through a plurality of reception antennas 2017-1 to 2017-n to provide respective digital baseband samples for antennas 2017-1 to 2017-n. At block 403, detector 2023 detects symbol streams corresponding to the respective antennas 2017-1 to 2017-n using the digital baseband samples, and signal quality processor 2025 computes respective measures of signal quality for each of the MIMO transport blocks using the detected symbol streams without decoding. For example, signal quality processor 2025 may compute respective signal strengths (e.g., SINRs), spectral efficiencies (e.g., EESMs), and/or information metrics (e.g., MIMs) for each of the MIMO transport blocks using the detected symbol streams without decoding.

At block 405, signal quality processor 2025 sorts the undecoded MIMO transport blocks by the measures of signal quality and selects the undecoded MIMO transport block based on the measures of signal quality. For example, signal quality processor 2025 may select the undecoded MIMO transport data block having the highest measure of signal quality (e.g., having the highest signal strength, the highest spectral efficiency, the highest information metric, etc.). At block 407, decoder 2041 of baseband processor 2009a-2 decodes the selected MIMO transport block (e.g., the MIMO transport block of the plurality of MIMO transport blocks having the highest measure of signal quality). Operations of decoding of block 407 are discussed in greater detail with respect to FIG. 7. At block 701 of FIG. 7, de-mapper 2027 de-mapps/demodulates the symbols for the selected MIMO transport block to provide an interleaved bit stream for the selected MIMO transport block. At block 703, de-interleaver 2029 de-interleaves the interleaved bit stream for the selected MIMO transport block to provide a de-interleaved bit stream for the selected MIMO transport block. At block 705, channel decoder 2031 decodes a channel for the de-interleaved bit stream for the selected MIMO transport block to provide a channel decoded bit stream. At block 707, CRC processor 2033 performs a cyclical redundancy check (CRC) on the channel decoded bit stream.

At block 409, interference cancellation feedback processor 2035 determines if decoding the undecoded transport block having the highest measure of signal quality is successful. Responsive to determining that decoding the MIMO transport block having the highest measure of signal quality failed at block 409, interference cancellation feedback processor 2035 terminates processing of all MIMO transport blocks received in the MIMO signal at block 411 and initiates transmitting a negative acknowledge (NACK) message for all of the transport blocks received in the MIMO signal at block 415.

Responsive to determining that decoding the selected MIMO transport block (e.g., the MIMO transport block having the highest measure of signal quality) is successful at block 409, interference cancellation feedback processor 2035 may initiate transmitting an acknowledge (ACK) message for the selected and decoded MIMO transport block at block 417, and a bit stream for the successfully decoded transport block may be passed to processor 101/201. In addition, interference cancellation feedback processor 2035 and/or detector 2023 may reduce a component of the MIMO signal corresponding to the selected MIMO transport block (e.g., the MIMO transport block having the highest measure of signal quality) to generate a reduced MIMO signal including remaining ones of the plurality of MIMO transport blocks excepting the decoded MIMO transport block at block 419. More particularly, detector 2023 may detect symbol streams for the remaining MIMO transport blocks using the reduced MIMO signal, and decoder 2041 of baseband processor 2009a-2 may decode one or more of the remaining undecoded MIMO transport blocks using the reduced MIMO signal at block 421, for example, using operations discussed above with respect to FIG. 7. For example, the same reduced MIMO signal may be used to decode all of the remaining transport blocks, or each successfully decoded MIMO transport block may be used to provide further reduced MIMO signals when decoding subsequent MIMO transport blocks. A bit stream for each successfully decoded transport block may be passed to processor 101/201.

Figure 5:
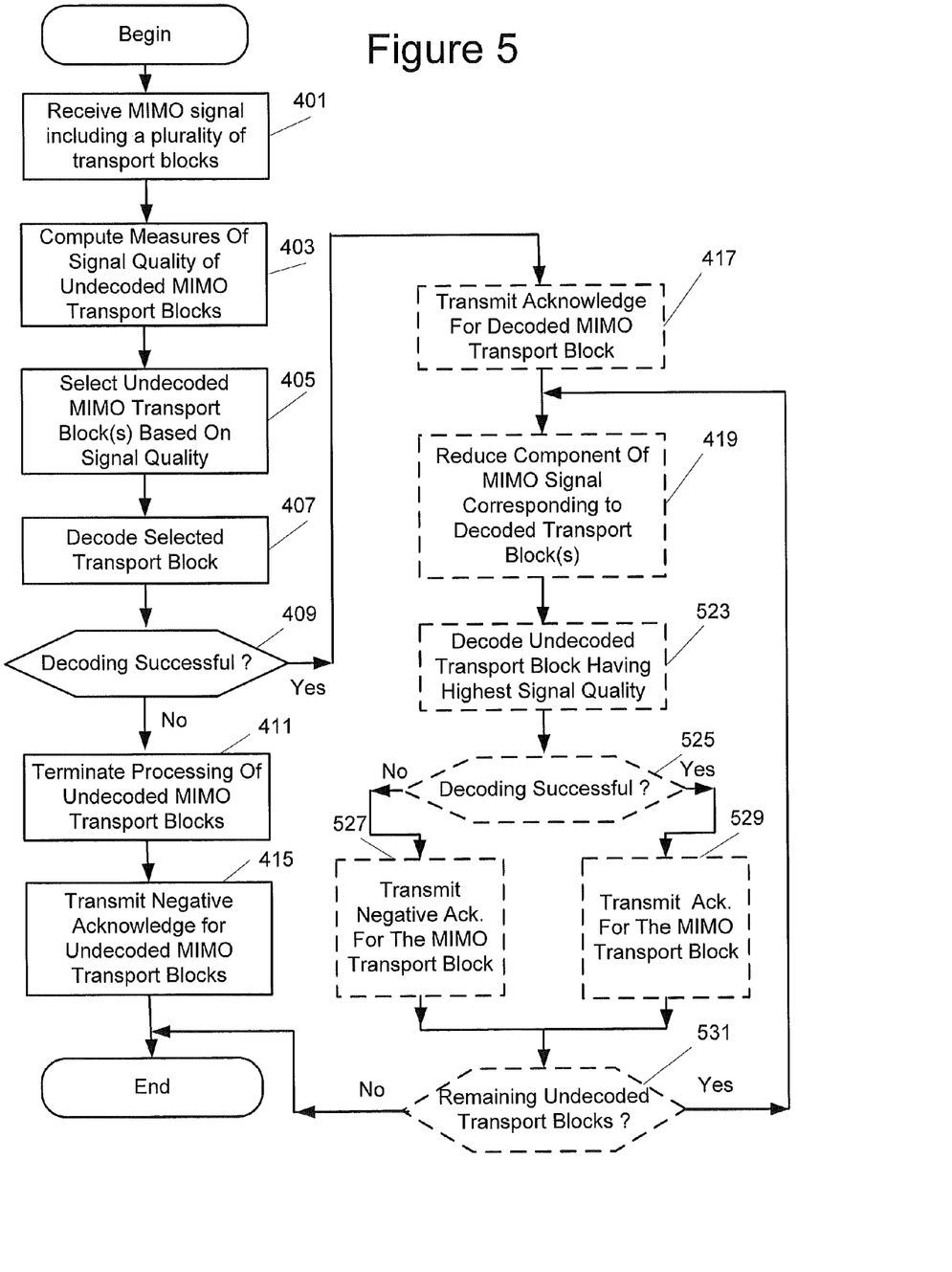

FIG. 5 is a flow chart illustrating operations of receiver 2009 that is configured to receive a plurality of multiple-input-multiple-output (MIMO) transport blocks transmitted from a plurality of MIMO transmission antennas over a same carrier frequency according to some other embodiments. Operations of blocks 401, 403, 405, 407, 409, 411, and 415 may be the same as discussed above with respect to the same numbered operations of FIG. 4 and will thus not be discussed further.

Responsive to determining that decoding the selected MIMO transport block (e.g., the MIMO transport block having the highest measure of signal quality) is successful at block 409, interference cancellation feedback processor 2035 may initiate transmitting an acknowledge (ACK) message for the decoded MIMO transport block at block 417, and a bit stream for the successfully decoded transport block may be passed to processor 101/201. In addition, interference cancellation feedback processor 2035 and/or detector 2023 may reduce a component of the MIMO signal corresponding to the selected MIMO transport block (e.g., the MIMO transport block having the highest measure of signal quality) to generate a reduced MIMO signal including remaining ones of the plurality of MIMO transport blocks excepting the decoded MIMO transport block at block 419.

At block 523, decoder 2041 of baseband processor 2009a-2 may decode a next of the remaining undecoded transport blocks in an order of measured signal quality as previously determined at blocks 403 and 405, for example, using operations discussed above with respect to FIG. 7. If the decoding is successful at block 525, interference cancellation feedback processor 2035 may initiate transmitting an acknowledge (ACK) message for the successfully decoded MIMO transport block at block 529, and a bit stream for the successfully decoded transport block may be passed to processor 101/201. If the decoding is unsuccessful at block 527, interference cancellation feedback processor 2035 may initiate transmitting a negative acknowledge (NACK) message for the unsuccessfully decoded MIMO transport block. At block 531, interference cancellation feedback processor 2035 and/or signal quality processor 2025 may determine if there are any remaining undecoded MIMO transport blocks. Accordingly, operations of blocks 419, 523, 525, 527, and 529 may performed for each of the remaining MIMO transport blocks (all of the MIMO transport blocks except the MIMO transport block having the highest measure of signal quality) in the order of signal quality as determined at blocks 403 and 405. According to other embodiments, remaining undecoded transport blocks may be reordered according to signal quality at each iteration between blocks 419 and 523 using the MIMO signal reduced based on all previously decoded MIMO blocks.

Figure 6:
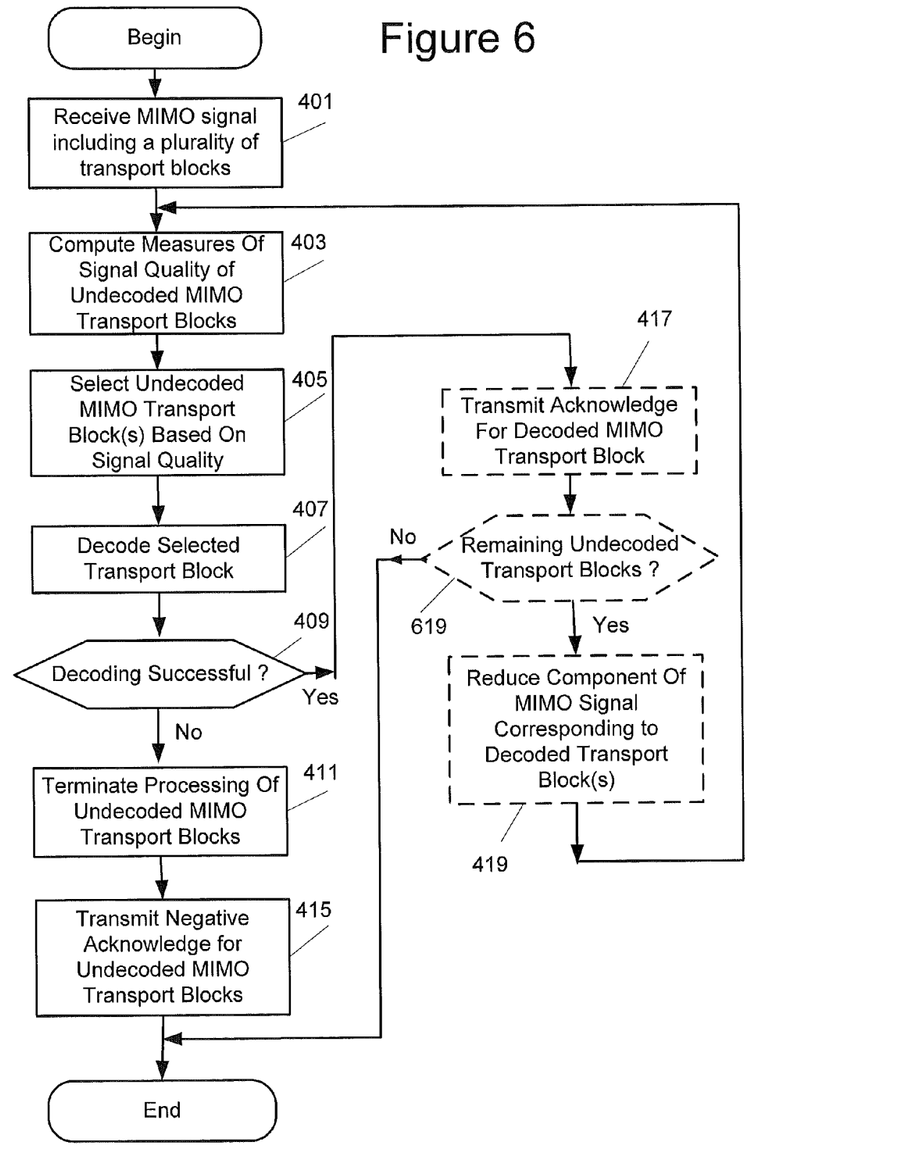
Figure 7:
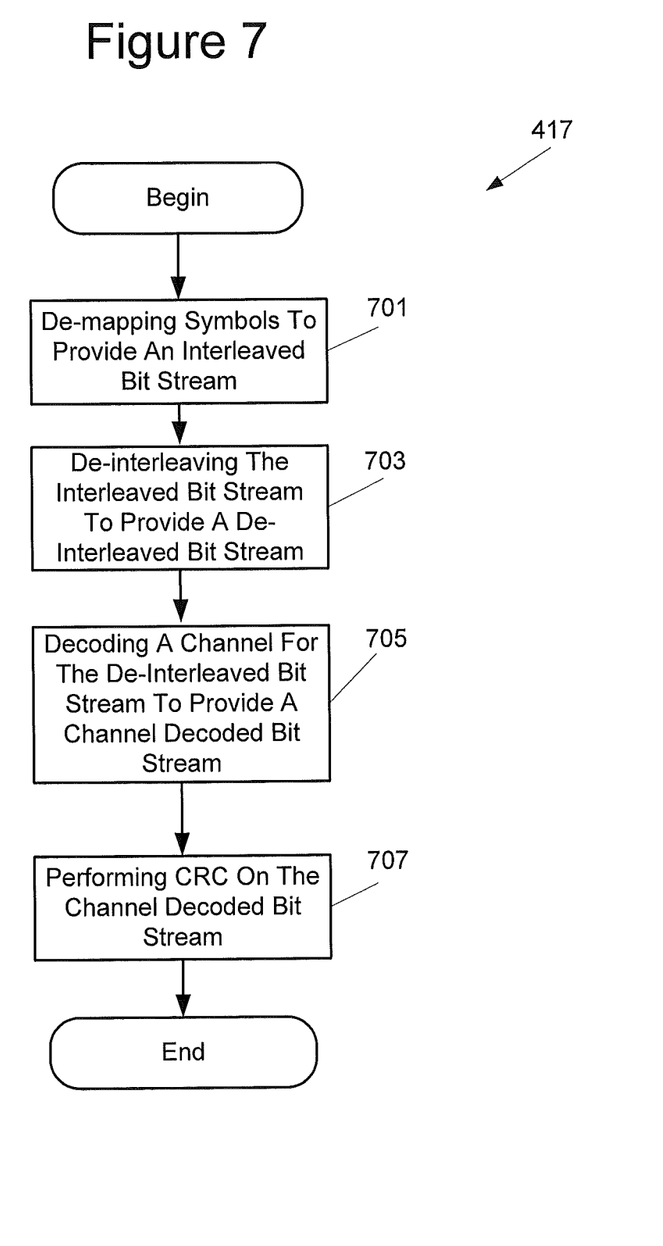

FIG. 6 is a flow chart illustrating operations of receiver 2009 that is configured to receive a plurality of multiple-input-multiple-output (MIMO) transport blocks transmitted from a plurality of MIMO transmission antennas over a same carrier frequency according to some other embodiments. Operations of blocks 401, 403, 405, 407, 409, 411, and 415 during a first iteration of FIG. 6 may be the same as discussed above with respect to the same numbered operations of FIG. 4 and will thus not be discussed further.

Responsive to determining that decoding the selected MIMO transport block (e.g., the MIMO transport block having the highest measure of signal quality) is successful at block 409, interference cancellation feedback processor 2035 may initiate transmitting an acknowledge (ACK) message for the decoded MIMO transport block at block 417, and a bit stream for the successfully decoded transport block may be passed to processor 101/201. In addition, interference cancellation feedback processor 2035 and/or detector 2023 may determine at block 619 whether any undecoded MIMO transport blocks remain. If there are remaining undecoded transport blocks at block 619, detector 2023 may reduce a component of the MIMO signal corresponding to the MIMO transport block having the highest measure of signal quality to generate a reduced MIMO signal including remaining ones of the plurality of MIMO transport blocks excepting the decoded MIMO transport block at block 419.

Operations of blocks 403, 405, 407, and 409 may then be repeated for the remaining MIMO transport blocks (excepting any previously decoded MIMO transport blocks). More particularly, detector 2023 may detect symbol streams for the remaining MIMO transport blocks using the reduced MIMO signal, and signal quality processor 2025 may compute respective measures of signal quality of the remaining undecoded MIMO transport blocks at block 403 using the detected symbol streams. The remaining undecoded MIMO transport blocks may be sorted by signal quality, and the remaining undecoded MIMO transport block having the highest measure of signal quality may be selected at block 405. The selected MIMO transport block may then be decoded at block 407, for example, using operations discussed above with respect to FIG. 7.

If decoding is unsuccessful at block 409, interference cancellation feedback processor 2035 may terminate processing of undecoded MIMO transport blocks at block 411 and initiate transmitting negative acknowledge (NACK) messages for all of the remaining undecoded MIMO transport blocks at block 415. If decoding is successful at block 409, an acknowledge (ACK) message may be transmitted for the decoded MIMO transport block at block 417, and a bit stream for the successfully decoded transport block(s) may be passed to processor 101/201. Operations of blocks 403, 405, 407, 409, 417, and 619 may thus be repeated for each MIMO transport block in order of signal quality (e.g., in order of signal strength, spectral efficiency, and/or information metric) until either a MIMO transport block is not successfully decoded at block 409 or all of the MIMO transport blocks have been decoded at block 619.

In embodiments of FIG. 6, MIMO transport blocks of a same MIMO signal may be successively decoded in order of signal quality (e.g., signal strength, spectral efficiency, and/or information metric), and each successfully decoded MIMO transport block may be reconstructed and subtracted from the MIMO signal to reduce MIMO interference with respect to lower quality (e.g., lower strength, lower spectral efficiency, and/or lower information metric) MIMO transport blocks that are yet to be decoded. As long as decoding of higher quality (e.g., higher strength, higher spectral efficiency, and/or higher information metric) MIMO transport blocks is successful, decoding may proceed to a next lower quality (e.g., lower signal strength, lower spectral efficiency, and/or lower information metric) MIMO transport block. Once decoding of a MIMO transport block fails, however, decoding of lower quality MIMO transport blocks may be terminated (e.g., at blocks 409 and 411) because there is a relatively low likelihood of decoding a lower quality MIMO transport block or blocks if a the receiver was unable to decode a relatively higher quality MIMO transport block. Accordingly, processing overhead and/or power consumption may be reduced by increasing a likelihood of decoding a lower quality MIMO transport block on a first attempt by reducing MIMO antenna interference due to the higher quality MIMO transport block(s) before decoding the lower quality MIMO transport block, and by terminating processing/decoding of lower quality MIMO transport blocks after failure decoding any higher quality MIMO transport block.

System-level simulation results are discussed below with respect to FIGS. 8, 9, and 10. Simulation results are presented in the context of 3GPP LTE downlinks in a 2×2 system with 2 transmit and 2 receive antennas and 2 MIMO transport blocks, and in a 4×4 system with 4 transmit and 4 receive antennas and 4 MIMO transport blocks. In the simulations, antenna patterns and shadowing models are included per the 3GPP evaluation methodology as set forth in $3^{rd}$ Generation Partnership Project, "UTRA-UTRAN Long Term Evolution (LTE) and 3GPP System Architecture Evolution (SAE)," http://www.3gpp/org/Highlights/LTE/LTE.htm. All results presented assume a frequency reuse of one. Synchronous and non-adaptive HARQ (hybrid automatic repeat request) with a maximum of 4 retransmissions is assumed. Simulations assume a Typical Urban (TU) channel model-A with 6 multipath components. Perfect channel estimation at the receiver is assumed.

Figure 10:
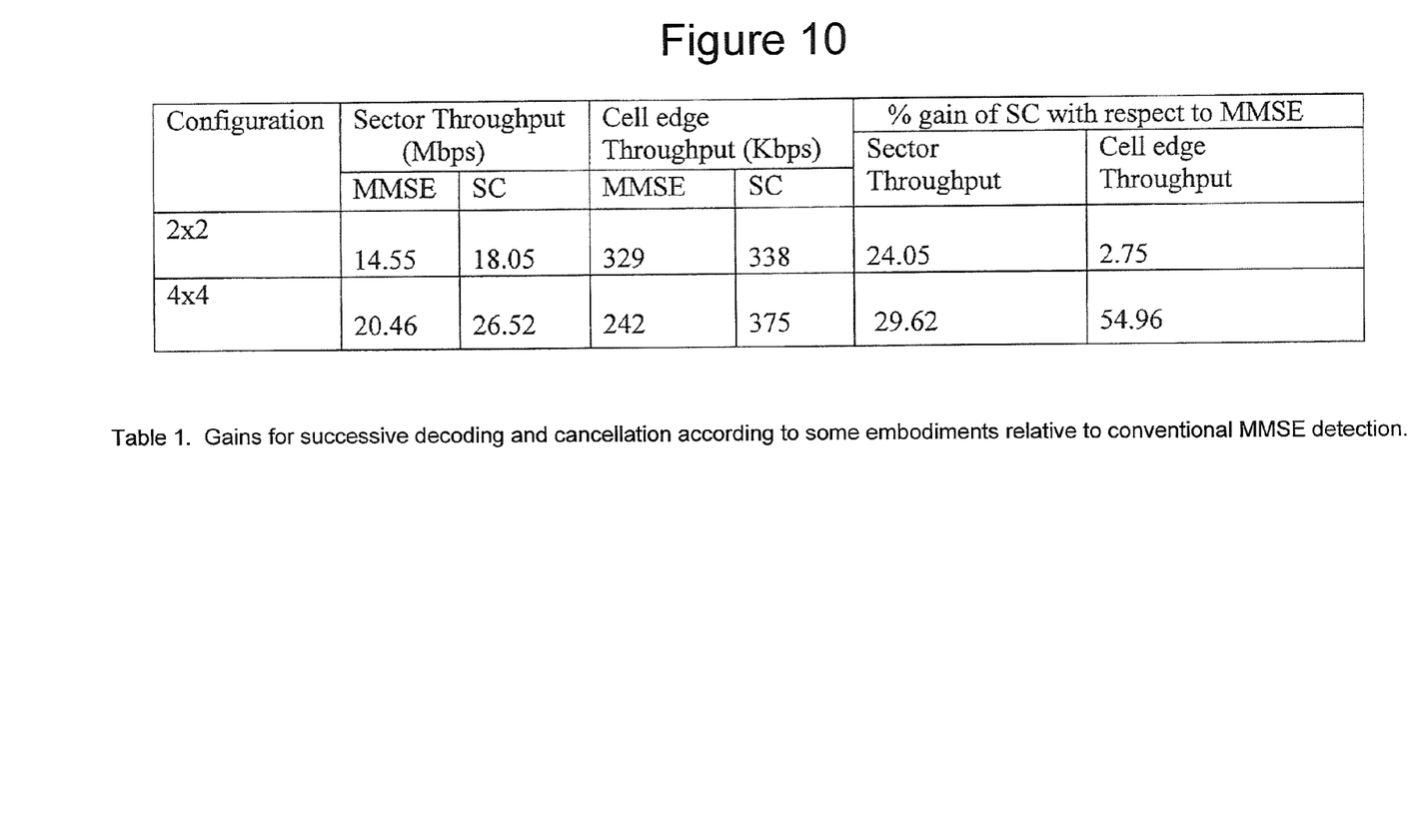
FIG. 10 is a table illustrating receiver gains according to some embodiments.

Table 1 of FIG. 10 summarizes sector throughput and cell edge user throughput gains achieved with the successive decoding and cancelation (SC) according to embodiments discussed herein as compared with conventional MMSE detection (MMSE). In a 2×2 system (with 2 MIMO transmit antennas, 2 MIMO receive antennas, and 2 MIMO transport blocks), simulations show a 24.05% gain in sector throughput and a 2.75% gain in cell edge throughput. In a 4×4 system (with 4 MIMO transmit antennas, 4 MIMO receive antennas, and 4 MIMO transport blocks), simulations show a 29.62% gain in sector throughput and a 54.96% gain in cell edge throughput. The comparative gains thus increase with increasing numbers of antennas and transport blocks. Accordingly, embodiments discussed herein may be applied in 8×8 systems (with 8 MIMO transmit antennas, 8 MIMO receive antennas, and 8 MIMO transport blocks) with even greater gains in throughput.

Figure 8:
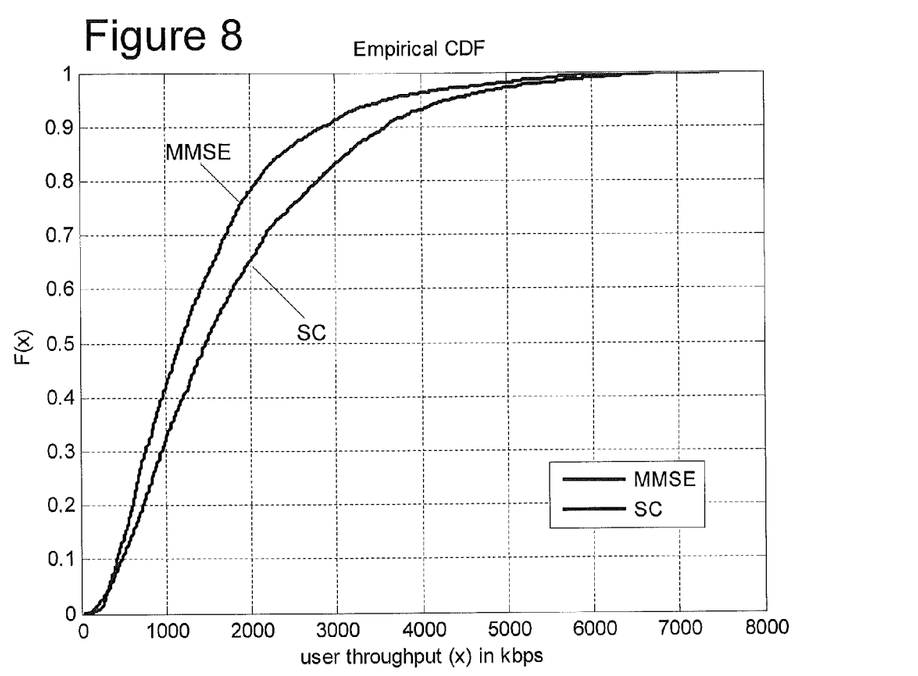
FIGS. 8 and 9 are graphs illustrating system performance as a function of receiver operation according to some embodiments.
Figure 9:
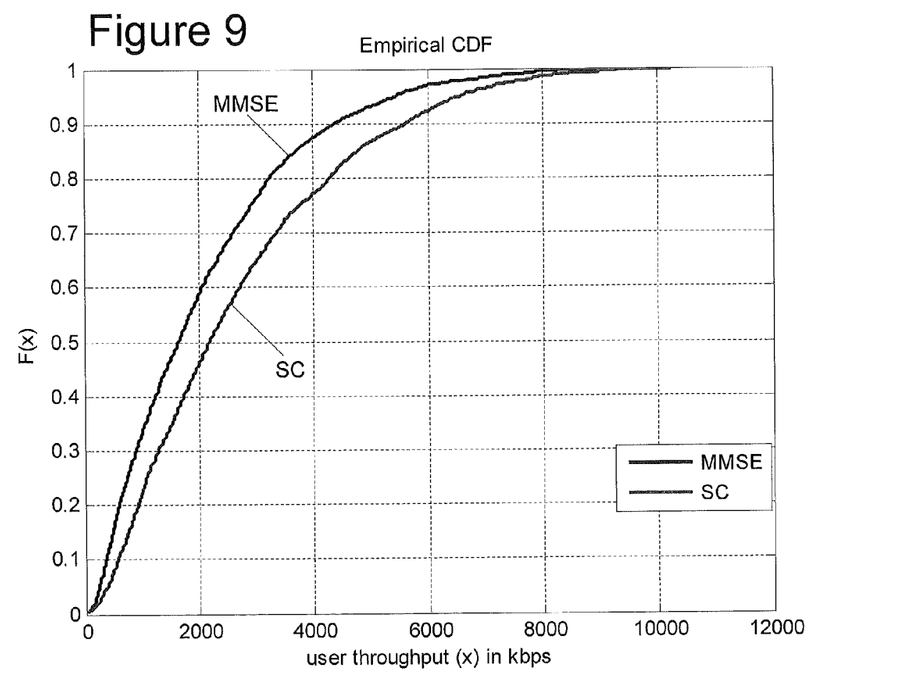

FIGS. 8 and 9 are graphs illustrating cumulative distribution functions (CDF) for successive decoding and cancellation (SC) according to embodiments discussed herein and for conventional MMSE detection (MMSE). In particular, FIG. 8 is a graph illustrating comparative CDFs for user throughput for 2×2 systems, and FIG. 9 is a graph illustrating comparative CDFs for user throughput for 4×4 systems. The SC plot of FIGS. 8 shows reduced probabilities of failure (indicated on the y-axis) to provide throughputs (indicated on the x-axis) over the range of about 1000 kbps to about 4000 kbps for a 2×2 system. The SC plot of FIG. 9 shows reduced probabilities of failure (indicated on the y-axis) to provide throughputs (indicated on the x-axis) over the range of about 1000 kbps to about 6000 kbps in a 4×4 system.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments, which fall within the spirit and scope of the present invention. Thus, to the maximum extent allowed by law, the scope of the present invention is to be determined by the broadest permissible interpretation of the following claims and their equivalents, and shall not be restricted or limited by the foregoing detailed description. Any reference numbers in the claims are provided only to identify examples of elements and/or operations from embodiments of the figures/specification without limiting the claims to any particular elements, operations, and/or embodiments of any such reference numbers.

What is claimed is:

1. A method of receiving a plurality of multiple-input-multiple-output, MIMO, transport blocks transmitted from a plurality of MIMO transmission antennas over a same carrier frequency, the method comprising:
    receiving a MIMO signal including the plurality of MIMO transport blocks through a plurality of reception antennas;
    computing respective measures of signal quality for each of the MIMO transport blocks;
    selecting a MIMO transport block from the plurality of MIMO transport blocks based on the measures of signal quality, wherein the selected MIMO transport block is selected to be a MIMO transport block having a highest measure of signal quality;
    decoding the selected MIMO transport block; and
    responsive to failure decoding the selected MIMO transport block, terminating processing of all MIMO transport blocks received in the MIMO signal.

2. The method of claim 1 further comprising:
    responsive to failure decoding the selected MIMO transport block, transmitting a negative acknowledge, NACK, message for all of the transport blocks received in the MIMO signal.

3. The method of claim 1 further comprising:
    responsive to successfully decoding the selected MIMO transport block, reducing a component of the MIMO signal corresponding to the selected MIMO transport block to generate a reduced MIMO signal including remaining ones of the plurality of MIMO transport blocks; and decoding one of the remaining ones of the plurality of MIMO transport blocks using the reduced MIMO signal.

4. The method of claim 1 further comprising:

responsive to successfully decoding the selected MIMO transport block, reducing a component of the MIMO signal corresponding to the selected MIMO transport block to generate a reduced MIMO signal including remaining ones of the plurality of MIMO transport blocks;

recomputing respective measures of signal quality for each of the remaining ones of the plurality of MIMO transport blocks using the reduced MIMO signal;

selecting one of the remaining ones of the plurality of MIMO transport blocks based on the measures of signal quality for each of the remaining ones of the plurality of MIMO transport blocks;

decoding the selected one of the remaining ones of the plurality of MIMO transport blocks; and responsive to failure decoding the selected one of the remaining ones of the plurality of MIMO transport blocks, terminating processing of all of the remaining transport blocks.

5. The method of claim 4 further comprising:

responsive to failure decoding the selected one of the remaining ones of the plurality of MIMO transport blocks, transmitting a negative acknowledge, NACK, message for all of the remaining transport blocks.

6. The method of claim 1 wherein computing respective measures of signal quality comprises computing respective signal strengths for each of the MIMO transport blocks.

7. The method of claim 6 wherein computing respective signal strengths comprises computing respective signal-to-interference-and-noise-ratios, SINRs, for each of the MIMO transport blocks.

8. The method of claim 1 wherein computing respective measures of signal quality comprises detecting symbols for each of the plurality of MIMO transport blocks and computing the respective measures of signal quality using the detected symbols for each of the plurality of MIMO transport blocks without decoding.

9. The method of claim 8 wherein decoding the selected MIMO transport block comprises, de-mapping the symbols for the selected MIMO transport block to provide an interleaved bit stream for the selected MIMO transport block, de-interleaving the interleaved bit stream for the selected MIMO transport block to provide a de-interleaved bit stream for the selected MIMO transport block, decoding a channel for the de-interleaved bit stream for the selected MIMO transport block to provide a channel decoded bit stream, and performing a cyclical redundancy check, CRC, on the channel decoded bit stream.

10. A communication device configured to receive a plurality of multiple-input-multiple-output, MIMO, transport blocks transmitted from a plurality of MIMO transmission antennas over a same carrier frequency, the communication device comprising:

a radio frequency front end configured to receive a MIMO signal including the plurality of MIMO transport blocks through a plurality of reception antennas; and a baseband processor coupled to the radio frequency front end, wherein the baseband processor configured to compute respective measures of signal quality for each of the MIMO transport blocks, to select a MIMO transport block from the plurality of MIMO transport blocks based on the measures of signal quality, wherein the selected MIMO transport block is selected to be a MIMO transport block having a highest measure of signal quality, to decode the selected MIMO transport block, and to terminate processing of all MIMO transport blocks received in the MIMO signal responsive to failure decoding the selected MIMO transport block.

11. The communication device of claim 10 wherein the baseband processor is further configured to transmit a negative acknowledge, NACK, message for all of the transport blocks received in the MIMO signal responsive to failure decoding the selected MIMO transport block.

12. The communication device of claim 10 wherein the baseband processor is further configured to reduce a component of the MIMO signal corresponding to the selected MIMO transport block to generate a reduced MIMO signal including remaining ones of the plurality of MIMO transport blocks responsive to successfully decoding the selected MIMO transport block, and to decode one of the remaining ones of the plurality of MIMO transport blocks using the reduced MIMO signal.

13. The communication device of claim 10 wherein the broadband processor is further configured to reduce a component of the MIMO signal corresponding to the selected MIMO transport block to generate a reduced MIMO signal including remaining ones of the plurality of MIMO transport blocks responsive to successfully decoding the selected MIMO transport block, to recompute respective measures of signal quality for each of the remaining ones of the plurality of MIMO transport blocks using the reduced MIMO signal, to select one of the remaining ones of the plurality of MIMO transport blocks based on the measures of signal quality for each of the remaining ones of the MIMO transport blocks, to decode the selected one of the remaining ones of the plurality of MIMO transport blocks, and to terminate processing of all of the remaining transport blocks responsive to failure decoding the selected one of the remaining ones of the plurality of MIMO transport blocks.

14. The communication device of claim 13 wherein the baseband processor is configured to initiate transmitting a negative acknowledge, NACK, message for all of the remaining transport blocks responsive to failure decoding the selected one of the remaining ones of the plurality of MIMO transport blocks.

15. The communication device of claim 10 wherein the baseband processor is configured to compute respective measures of signal quality by computing respective signal strengths for each of the MIMO transport blocks.

16. The communication device of claim 15 wherein the baseband processor is configured to compute respective signal strengths by computing respective signal-to-interference-and-noise-ratios, SINRs, for each of the MIMO transport blocks.

17. The communication device of claim 10 wherein the baseband processor is configured to detect symbols for each of the plurality of MIMO transport blocks, and to compute respective measures of signal quality using the detected symbols for each of the plurality of MIMO transport blocks without decoding.

18. The communication device of claim 17 wherein the baseband processor is configured to decode the selected MIMO transport block by de-mapping the symbols for the selected MIMO transport block to provide an interleaved bit stream for the selected MIMO transport block, de-interleaving the interleaved bit stream for the selected MIMO transport block to provide a de-interleaved bit stream for the selected MIMO transport block, decoding a channel for the de-interleaved bit stream for the selected MIMO transport block to provide a channel decoded bit stream, and performing a cyclical redundancy check, CRC, on the channel decoded bit stream.

19. The communication device of claim 10 wherein the radio front end is configured to generate digital baseband samples for each of the plurality of MIMO transport blocks, wherein the baseband processor is configured to generate symbols for each of the plurality of MIMO transport blocks responsive to the digital baseband samples, and wherein the baseband processor is configured to compute the respective measures of signal quality using the symbols without decoding.

* * * * *